United States Patent [19]
Leavenworth, Jr. et al.

[11] 3,892,639
[45] July 1, 1975

[54] EXTRACTION OF METAL VALUES FROM LATERITIC ORES

[75] Inventors: Howard W. Leavenworth, Jr., Washington, D.C.; Earle B. Amey, Greenbelt, Md.; Beverly W. Dunning, Jr., Adelphi, Md.; Robert C. Gabler, Jr., Grasonville, Md.; Carl E. Goldsmith, Brandywine, Md.

[73] Assignee: The United States of America as represented by the Secretary of the Interior, Washington, D.C.

[22] Filed: Sept. 11, 1974

[21] Appl. No.: 504,464

[52] U.S. Cl. ........ 204/105 M; 204/105 R; 204/113; 204/128; 75/1; 75/10; 75/11; 75/21; 75/26; 75/49; 75/119; 75/121; 423/140; 423/149; 423/633
[51] Int. Cl. .......................... C22d 1/14; C22d 1/24
[58] Field of Search ......... 75/113, 21, 26, 119, 121, 75/1, 10, 11, 49; 204/105 R, 105 M, 113, 128; 423/140, 149

[56] References Cited
UNITED STATES PATENTS

| | | | |
|---|---|---|---|
| 2,030,868 | 2/1936 | Hart | 423/149 |
| 2,777,755 | 1/1957 | Eberhardt | 423/149 |
| 2,797,155 | 6/1957 | Vaughan | 423/149 |
| 2,843,472 | 7/1958 | Eberhardt | 423/633 |
| 3,773,635 | 11/1973 | Kane et al. | 204/105 M |

*Primary Examiner*—R. L. Andrews
*Attorney, Agent, or Firm*—Gersten Sadowsky; Donald R. Fraser

[57] ABSTRACT

There is disclosed a method for the extraction of metal values from laterite ores including nickel, chromium, manganese, iron and cobalt by a series of steps including chlorinating the ore in a fluidized bed with hydrogen chloride gas to form volatile metal chlorides of nickel, iron, cobalt and manganese, and a residue containing chromium, removing and condensing the volatile chlorides to effect separation, recovering the metals of nickel, cobalt and manganese and chlorine as by the use of electrolytic cells, reacting the iron chloride with oxygen to separate the iron as iron oxide; removing the residue from the fluid bed reactor for reduction with carbon to produce carbides; leaching to form salts of chromium, separating from other salts, and recovering the chromium. Also provided is a continuous method for practice of the process.

11 Claims, 1 Drawing Figure

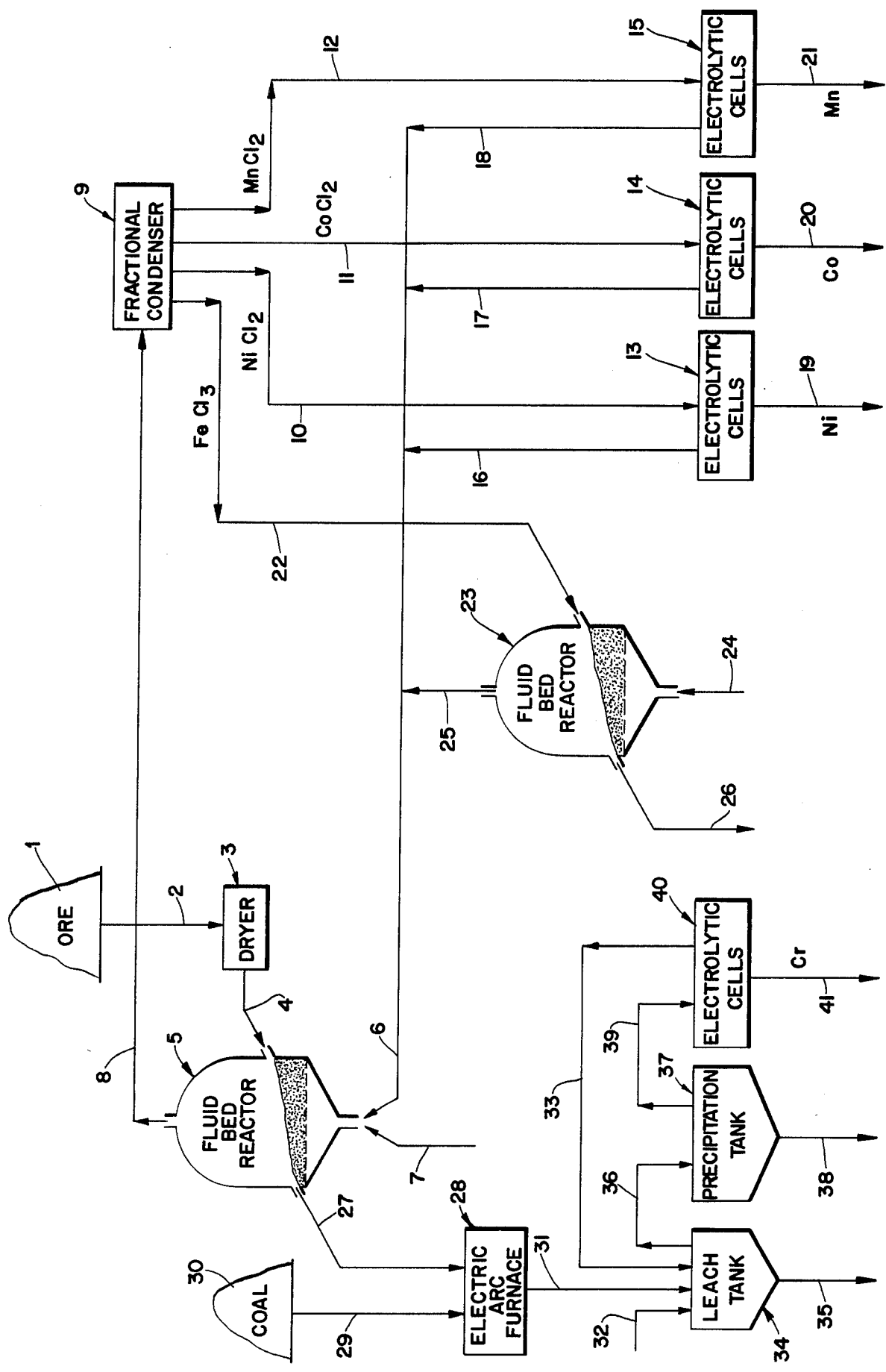

EXTRACTION OF METAL VALUES FROM LATERITIC ORES

BACKGROUND OF THE INVENTION

1. FIELD OF THE INVENTION

This invention relates to a process for winning nickel, manganese, iron, cobalt and chromium metals from oxide and silicate ores, especially of the laterite type and more particularly to a continuous process for separating and recovering the various metals contained in laterite type ores by use of fluid bed reactors and fractional condensation.

2. DESCRIPTION OF THE PRIOR ART

In the art of metallurgy a great deal of effort has been expended toward the extraction of various metallic values from domestic ores. Among the most important of these procedures has been attempts to provide for the extraction and recovery of nickel and chromium and other metal values from laterite ores. Nickel and chromium are very important metals throughout industry as at the present time the United States must import about 90% of the nickel and all of the chromium needed for the various tools, dies, stainless steel and high temperature alloys which are in constant use throughout industry. Various procedures have been devised in an effort to provide methods for the extraction of these valuable metals from ores of this type and the art is aware of many of these procedures. Some of these procedures provide methods for the extraction of nickel, manganese, cobalt and iron from such ores but none of the processes disclose procedures by which nickel and chromium as well as the other metal values can be obtained from such ores. One of the problems with such extraction processes is the formation of a calcium nickel silicate complex which forms to inhibit recovery of the metals. Also, ferro-nickel forms rather than nickel so that the products do not segregate but rather deposit heterogenerously.

A patent of pertinence to processes of this type is U.S. Pat. No. 2,843,472 which relates to the treatment of iron bearing ores particularly those of the Mayari type which contain iron and impurities including chromium, nickel, cobalt and manganese. According to this patent, hydrogen chloride or chlorine is reacted with the ore to reduce the ferric oxide to ferric chloride and water vapor, the ferric chloride and water vapor are removed from the ore bed, and the ferric chloride is converted to ferric oxide for ultimate recovery. This patent however, discloses only a method for recovering the iron from the ores but does not provide procedures for recovery of the other valuable metals as the temperature in the ore bed is maintained so that the chlorides of nickel, cobalt and manganese do not volatilize.

In addition to this prior art, an article in "Industrial and Engineering Chemical Process Design and Development," Vol. 10, No. 4, 1971, page 523, discloses the reaction of hydrogen chloride with iliminite in a fluidized bed reactor at a temperature of about 800°C. to selectively chlorinate iron. The HCl is produced by burning chlorine with hydrogen in the reactor and 98% of the hydrogen chloride is used utilizing a 4% excess of hydrogen. However, this procedure does not disclose a complete method for recovery of the various metallic values contained in the ore.

SUMMARY OF THE INVENTION

It is accordingly one object of this invention to provide a method for the extraction and recovery of nickel and chromium and other metallic values from laterite ores.

A still further object of the invention is to provide a method for the extraction and recovery of nickel, chromium and other metallic values including iron, cobalt and manganese from laterite ores involving the initial formation of chlorides of all metals except chromium and recovery of the metals from their chlorides.

A still further object of the invention is to provide a method for chlorinating laterite ores in a fluidized bed with HCl gas to form volatile chlorides of metal values contained therein, removing the volatile chlorides and recovering the chlorine from the metal chlorides for recycle to the fluidized bed reactor.

A still further object of the invention is to provide a continuous procedure for the formation of chlorides of the metal values contained in laterite ores for ultimate recovery of all of the pure metallic values contained in the ore and the recovery of the chromium from a fluidized bed residue by reduction and extraction.

Other objects and advantages of the present invention will become apparent as the description thereof proceeds.

In satisfaction of the foregoing objects and advantages there is provided by this invention a method for the recovery of metallic values contained in laterite ores which comprises reaction of the ore with hydrogen chloride gas in a fluid bed reactor, the hydrogen chloride being formed in situ by the reaction of hydrogen and chlorine, to form volatile chlorides of nickel, iron, cobalt and manganese and a residue containing chromium as a chormite; removing the volatile chlorides from the fluid bed reactor and condensing to recover the chlorides of nickel, iron, manganese and cobalt; removing the residue from the fluid bed reactor and reducing the chromium-carbide complex followed by extraction to recover the chromium. Also provided by this invention are additional procedures including a continuous procedure by which the various metal values may be recovered in pure form separated from the chlorine, and recycle of the chlorine to the fluid bed reactor for reuse, as well as continuous procedures for removal of residue from the fluidized bed for reduction, leaching, precipitation, and ultimate recovery of the chromium from the laterite ores.

BRIEF DESCRIPTION OF THE DRAWING

Reference is now made to the drawing accompanying this application wherein there is presented a schematic illustration of a specific embodiment of this invention.

DESCRIPTION OF PREFERRED EMBODIMENTS

As indicated above, this invention relates to the extraction of valuable metallic values from ores of the laterite type. According to this invention, the inventors have found by experimentation that the metals nickel, cobalt, manganese and iron as well as chromium can be easily and efficiently recovered from laterite ores which contain these metals in admixture. A basic concept on which the invention is based, is that the nickel, cobalt, manganese and iron contained in the ores can be chlorinated in a fluidized bed by HCl gas in order to form volatile chlorides of these metals. These volatile metal chlorides can then be removed and condensed separately and reduced to the free metal in separate electrolytic cells or they can be condensed collectively and separated by ion exchange. In addition, in the process of this invention the chromium contained in the laterite ore can be recovered from the spent residue left in the fluidized bed after chlorination and volatilization of the chlorides. This invention also includes operation of the process in a continuous manner so that a portion of the residue from the fluizied bed can be continuously removed and processed for chromium recovery. Moreover, as a part of the process, the chlorine can be recovered from the electrolytic cells and returned to the fluidized bed to be burnt with hydrogen to form the required HCl gas and supply heat to the fluidized bed in completing a cyclic operation. Moreover, a portion of the hydrogen and some acetylene for additional heat can also be recovered from the leach tanks during chromium dissolution. The chromium is recovered from the fluidized bed residue by reducing the chromite in the residue with carbon such as may be obtained from anthracite coal or hogged fuel.

In the first step of the process of this invention, crushed laterite ore is dried and then fed to a fluidized bed reactor operated under sufficient conditions to maintain the ore in a fluidized state. In the fluidized bed reactor the ore is chlorinated by the introduction of hydrogen chloride gas which may be formed in situ by the introduction of hydrogen and chlorine. This is a beneficial step since the chlorine from later steps in the process can be recycled to form the HCl. Introduction and reaction of the fluidized bed with the hydrogen chloride gas under the conditions of the reaction yield volatile chlorides of the metals contained therein and particularly the chlorides of nickel, iron, cobalt and manganese. The conditions under which the chlorination are carried out include maintenance of a temperature of about 800°–1200°C. with a residence time of about 2–6 hours. In general, the fludizing gas is any inert gas but preferably an inert gas such as nitrogen. A linear gas flow of about 0.5 to 1.0 centimeters per second is suitable. The fluidized bed reactor may be operated under the following conditions utilizing the equations given for the recovery of nickel and iron from a domestic laterite ore:

$$Ni = 2 \times 10^{-7}(T)^{2.5}(Y)^{0.5}(V)^{0.4}(t)^{0.6} \quad (1)$$
$$Fe = 7.65 \times 10^{-7}(T)^2 Yvt \quad (2)$$

where Ni = the recovery of nickel, pct; Fe = the recovery of iron, pct; $T$ = absolute temperature, °K; $Y$ = mole fraction of hydrogen chloride in the entering gas stream; $v$ = velocity of the entering gas stream, cm per sec; and $t$ = time, minutes.

In the fluidized bed there are recovered the chlorides of the metals present which will form volatile chlorides and in particular, $FeCl_3$, $NiCl_2$, $CoCl_2$ and $MnCl_2$. These volatile chlorides are removed, then subjected to fractional condensation to separate the chlorides based on their temperature of condensation. The fractional condensation may be carried out by standard art methods. By this method, the individual chlorides of each metal may be recovered as such or in a preferred embodiment, the chlorides of nickel, cobalt and manganese are passed to separate electrolytic cells to diassociate the metals from the chlorine and recover the free metals. In a particularly preferred embodiment, the chlorine produced in the electrolytic cell is then recycled to the fluidized bed reactor for reuse in the formation of hydrogen chloride gas. Alternatively, it is also possible to separate the cobalt, nickel, and manganese chlorides by electrorefining techniques or a combination of electrorefining and vapometallurgy rather than by the fractional condensation and electrolytic cell procedures.

The electrolytic cell utilized in this step and in the chromium recovery step is of the type well known to the art and is operated by known procedures. In general, it is preferred to carry out the electrolysis in a diaphragm-type cell which produces the metal as a cathode deposite. The pH of the electrolyte is preferably about 0.5 to 6 and additives may be present as desired. Typical cells of this type are disclosed for example in U.S. Pat. Nos. 3.093,557 and 3,804,776.

The iron chloride recovered from the fractional condensation step which has the lowest condensing temperature is preferably cycled to a separate fluidized bed where it is oxidized by the addition of oxygen to the bed to form iron oxide and chlorine, recovering the iron oxide as $Fe_2O_3$ and recycling the chlorine to the main fluidized bed reactor. This reactor is maintained at a temperature of about 600° to 1000°C. with a 4–6 hour residence time and using nitrogen as the fluidizing gas.

In the meantime, with all the volatile chlorides removed from the main fluidized bed reactor, the residue will contain the chromium from the laterite ore. The chromium is present as chromite and is not affected by the hydrogen chloride gas. According to this invention, the chromium is recovered by removing the ore to an electric arc furnace and carrying out a reduction step in the presence of carbon which is usually provided by coal or other bituminous fuel, in order to form a carbide of chromium and other metals such as iron contained in the residue. In a preferred embodiment of the invention, the chromium recovery is facilitated by not extracting all the iron from the fluidized bed by chloride formation but rather leaving 10–20% of the original iron in the residue as this helps to recover up to 90% of the original chromium. Thus, in a preferred embodiment of the invention, 10–20% of the iron is retained in the residue to facilitate chromium recovery.

The electric arc furnace is of the type well known to the art as disclosed for example in U.S. Pat. Nos. 1,543,321 and 3,301,669. In general, in the furnace, the residue containing the chromite and iron if present, is charged to the furnace, electrodes are inserted and the residue melted by heat from the electrical arc. The presence of the carbon material provides carbon for formation of carbides as the melt cools. A reducing gas such as hydrogen and CO is introduced to aid the reduction step. Temperatures in the furnace may range from about 1000°C. to 2500°C.

The iron and chromium carbide mixture from the electric arc furnace is then subjected to leaching with sulfuric acid and/or an alkali metal or ammonium salt to form sulfates of chromium and iron. Leaching is carried out by means well known to the art. The salts are then separated from the gangue by filtration removed from the leach tank and subjected to fractional precipitation for separation. The iron salt is precipitated and the chromium sulfate salt is then passed to an electrolytic cell where the chromium is separated from the sulfate mixture. Spent electrolyte from the electrolytic cell may then be recycled to the leach tank. The electrolytic cell is operated in a standard manner known to the art and as described above. Hydrogen from the leaching step may be recycled to the main fluidized bed reactor to combine with chlorine in forming HCl.

This process may be practiced on a batch basis in order to recover the valuable nickel, chromium and other metals from the laterite ore. However, in particularly beneficial aspects of the invention, the process is practiced in a continuous manner for the continuous recovery of the various valuable metals from the laterite ore and recycle of the chlorine and hydrogen as well as spent electrolyte with respect to the chromium step in the process. Thus, the continuous operation represents a particularly preferred embodiment of the present invention.

Reference is now made to the drawing accompanying this application where there is shown a specific embodiment of the process of this invention. In the drawing, finely divided laterite ore from storage 1 is passed by line 2 to dryer 3 and then via line 4 to fluid bed reactor 5. In the fluidized reactor 5 the ore, being in finely divided form, is maintained in fluidized physical form by the introduction of inert nitrogen (not shown) in accordance with known procedures for operation of a fluidized bed. The fluidized bed is maintained at a temperature of 1000°C. with a linear gas glow of 0.8 centimeters per second. Hydrogen from line 7 and recycled chlorine from line 6 are introduced into the fluidized bed for the formation of hydrogen chloride gas in situ. Sufficient hydrogen and chlorine are introduced to provide 0.567 mole fraction of HCl gas. The residence or reaction time in the fluidized bed is 178 minutes.

The resulting volatile chlorides $FeCl_3$, $NiCl_2$, $CoCl_2$ and $MnCl_2$ are removed from the top of the fluidized bed reactor 5 by line 8 and passed to fractional condenser 9. The fractional condenser is operated by known procedures which need not be further described here in order to provide condensation of the various chlorides according to their temperature of condensation. The nickel chloride, cobalt chloride and manganese chloride condense first and are passed by lines 10, 11 and 12 respectively to electrolytic cells 13, 14 and 15. The electrolytic cells are operated by known methods as described under such conditions as to effect a disassociation of the metal from the chlorine. As a result, the free nickel, cobalt and manganese are recovered as cathode deposits from lines 19, 20 and 21 respectively. The chlorine evolved in the electrolytic cells 13, 14 and 15 is recycled by lines 16, 17 and 18 to line 6 for reuse in fluid bed reactor 5.

The iron chloride, having the lowest condensing temperature from fractional condenser 9, is removed by line 22 and sent to fluidized bed reactor 23 where it is maintained in fluidized form by introduction of nitrogen gas at 800°C. Oxygen is introduced by line 24 into fluid bed reactor 23 for reaction with the iron chloride in order to effect dechlorination of ferric chloride with the oxygen. The resulting iron oxide, $Fe_2O_3$, is removed and recovered from the fluid bed reactor by line 26. The chlorine evolved during dechlorination is removed by line 25 and recycled by line 6 to the main fluid bed reactor.

From the fluidized bed reactor 5 a portion of the residue is continuously removed by line 27 and chromium is recovered from this spent residue. The spent residue contains the chromium as chromite and is sent to electric arc furnace 28 for reduction with carbon, in this case, by coal introduced from storage 30 by line 29. Hydrogen gas is also introduced into the furnace. Heating of the spent residue in the electric arc furnace at a temperature of about 1200°C. to 1600°C. with about 20–30 weight percent of coal is sufficient to effect reduction of the chromite to chromium carbide. This spent residue also contains about 10% of iron and in the electric arc furnace the iron is reduced to iron carbide. The preferred conditions within the electric arc furnace comprise a temperature of about 1500°C. with a residence time of about 2–3 hours. The presence of a limestone flux within the electric arc furnace improves the recovery of chromium as does the presence of the iron.

The iron and chromium carbides recovered from the electric arc furnace comprise an alloy having an iron chromium ratio of about 9 to 1, but this particular ratio will depend upon the amount of iron remaining in the residue after volatilization of chlorides. This mixture is then solidified, crushed and leached with a mixture of sulfuric acid and ammonium sulfate. In the specific embodiment illustrated, the iron/chromium carbides are removed by line 31 to leach tank 34 and leached by the addition of sulfuric acid and ammonium sulfate as recycle spent electrolyte introduced by line 33. Make-up or fresh solution may be added by line 32 to leach tank 34. After leaching, the gangue is removed from leach tank 34 in line 35 by filtration while the chromium ammonium sulfate [$CrNH_4(SO_4)_2$] and ferric ammonium sulfate [$Fe(NH_4)_2(SO_4)_2$] are removed by line 36 and sent to precipitation tank 37 where fractional precipitation is carried out based on the differences in solidification temperatures of the chromium and iron salts. As a result, the $Fe(NH_4)_2(SO_4)_2$ is removed by line 38 while the $CrNH_4(SO_4)_2$ is removed by line 39 and is then sent to electrolytic cell 40 for dissociation of the salt and the spent ammonium sulfate electrolyte. The spent electrolyte is recycled by line 33 to leach tank 34 and the chromium metal is recovered at line 41.

The laterite ores suitable for use in this process include limonitic and garnieritic lateritic ores such as high-iron laterites, saprolites, decomposed ultra-basic rocks and their serpentized derivatives, and the so-called garnierites or nickel-enriched serpentines.

The invention has been described herein with reference to certain preferred embodiments, however, as obvious variations thereon will become apparent to those skilled in the art, the invention is not to be considered as limited thereto.

What is claimed is:

1. A method for the extraction of nickel, chromium and other metallic values from laterite ores which comprises chlorinating the ore in a fluidized bed with hydrogen chloride gas to form volatile metal chlorides of nickel and other metals except chromium; and a residue containing chromium, removing the volatile metal chlorides from the fluidized bed and condensing to recover the chlorides of nickel and the other metals; removing at least a portion of the chromite-containing residue from the fluidized bed reactor which contains chromium, reducing with carbon to form a carbide of chromium, leaching to form chromium salts, and recovering the chromium.

2. A method according to claim 1 wherein the chlorides of nickel, iron, cobalt and manganese are volatilized and then fractionally condensed to effect separation, passing the chlorides of nickel, cobalt and manganese to electrolytic cells for recovering of the metal and chlorine, passing the iron to a fluidized bed for reaction with oxygen to recover the iron as iron oxide.

3. A method according to claim 2 wherein the chlorine recovered from the electrolytic cells and oxidation of iron is recycled to the main reactor.

4. A method according to claim 3 wherein the chlorination is carried out by reacting the laterite ore with hydrogen chloride gas at a temperature of about 900°–1400°C.

5. A method according to claim 4 wherein the hydrogen chloride gas is formed in situ by the separate introduction of stoichiometric amounts of hydrogen and chlorine.

6. A method according to claim 5 wherein the chlorine is recycled chlorine recovered from the electrolytic cells from which the nickel, cobalt and manganese are recovered and the oxidation of iron chloride from which the iron oxide is recovered.

7. A method according to claim 6 wherein the spent residue is reduced by reaction at 1000°C. to 2500°C. with 20–30 weight percent of a bituminous fuel.

8. A method according to claim 7 wherein the reduction is carried out in an electric arc furnace to form an alloy of iron and chromium carbides.

9. A method according to claim 8 wherein the mixture of iron and chromium carbides is then leached by reaction with a stoichiometric amount of sulfuric acid and ammonium sulfate and then subjected to precipitation to separate the iron ammonium sulfate from the chromium ammonium sulfate.

10. A method according to claim 9 wherein the chromium ammonium sulfate is then dissociated in an electrolytic cell to recover the chromium and provide a spent electrolyte of ammonium sulfate which can be recycled.

11. A continuous method for the extraction of nickel, chromium, iron, manganese and cobalt from laterite ores which comprises the steps of chlorinating the laterite ore in a main fluidized bed by reaction with hydrogen chloride gas at a temperature of about 900° to 1400°C. to form volatile metal chlorides of iron, nickel, cobalt and manganese and a residue containing the chromium and the remainder of the iron; removing the volatile metal chloride and fractionally condensing to separate iron chloride, nickel chloride, cobalt chloride and manganese chloride, passing the iron chloride to a fluid bed reactor and reacting the oxygen to form ferric oxide and chlorine, passing the nickel chloride, cobalt chloride and manganese chloride separately to electrolytic cells for dissociation of the metallic chlorides and recovering separately the nickel, cobalt and manganese; recycling the evolved chlorine from the iron fluid bed reactor and the electrolytic cells to the main fluid bed reactor for reaction with hydrogen in the formation of hydrogen chloride for reuse in the main fluid bed reactor; removing at least a portion of the spent residue from the main fluid bed reactor to an electric arc furnace and reducing the residue with about 20–30 weight percent of carbon to form carbides, removing the resulting carbides and leaching with sulfuric acid, alkali metal or ammonium salt thereof to form sulfates, separating the resulting iron and chromium sulfates by precipitation, passing the chromium sulfate to an electrolytic cell for dissociation into chromium and spent electrolyte, recovering the chromium metal, and recycling the spent electrolyte to the leaching step.

* * * * *